Oct. 31, 1950   F. T. RANNEY   2,527,849
FILLING APPARATUS FOR TRACTOR FUEL TANKS
Filed April 9, 1945
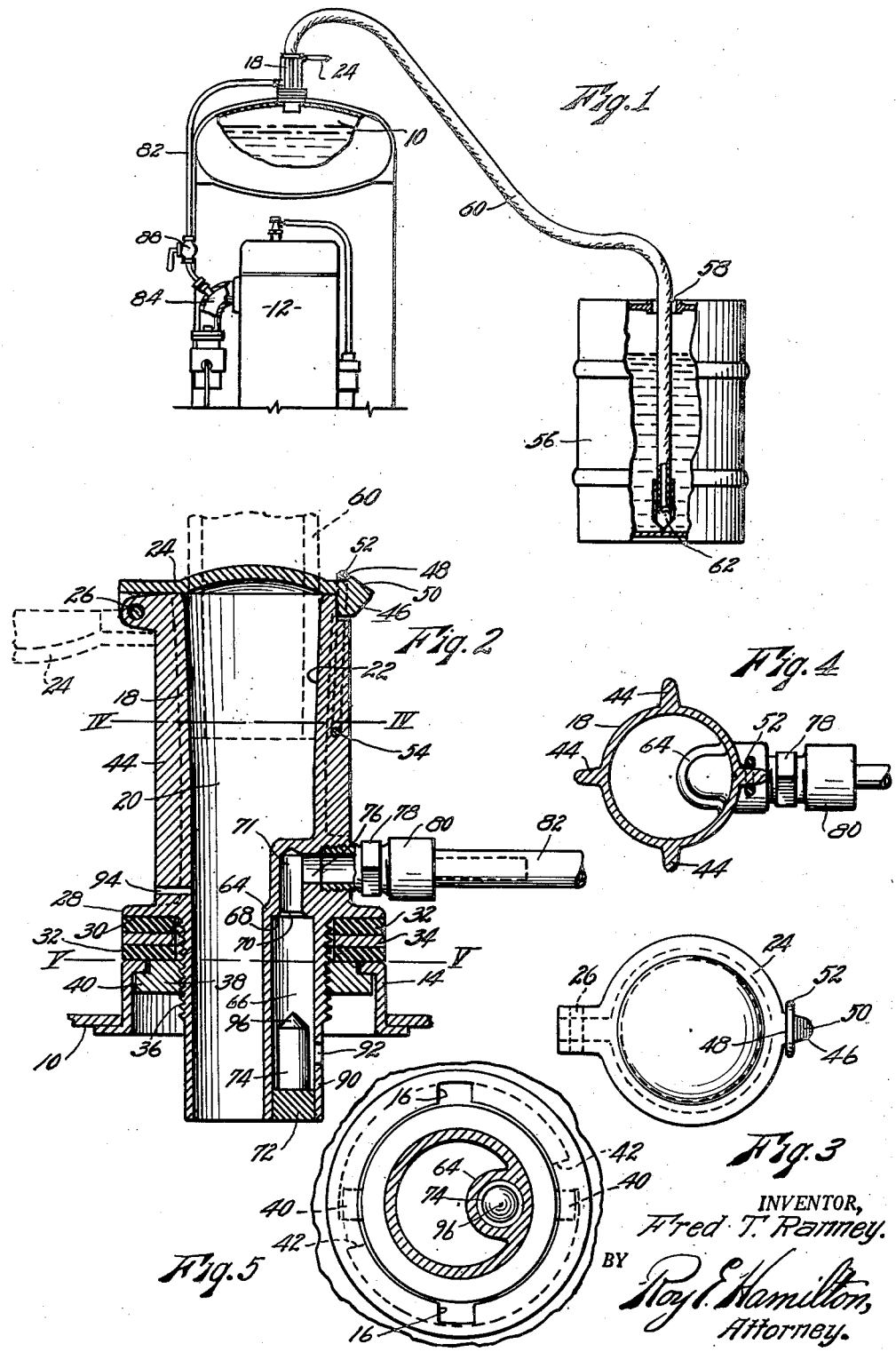
INVENTOR,
Fred T. Ranney.
BY
Roy E. Hamilton,
Attorney.

Patented Oct. 31, 1950

2,527,849

UNITED STATES PATENT OFFICE 2,527,849

FILLING APPARATUS FOR TRACTOR FUEL TANKS

Fred T. Ranney, Minneapolis, Minn.

Application April 9, 1945, Serial No. 587,382

5 Claims. (Cl. 226—116)

This invention relates to filling apparatus for tractor fuel tanks and has particular reference to a tank filling means whereby the liquid fuel such as gasoline in a container, is raised by suction of the tractor engine to the tractor fuel tank positioned thereabove.

In using an apparatus of this general type for filling the fuel tank, much difficulty has been experienced in collapsing the fuel tank, due to lack of proper control of the vacuum created therein.

It is the principal object of the present invention to so construct the apparatus as to admit a constant air flow thereto to control the vacuum in the fuel tank while being filled with liquid to prevent too high a vacuum therein.

Another object of the invention is the provision of a vacuum valve structure having an atmospheric inlet port and a vacuum shut-off valve so related and positioned that no objectionable amount of gasoline can be drawn from the fuel tank into the engine through the vacuum tube.

Other objects are simplicity and economy of construction, ease and efficiency of operation and adaptability for use with engines producing vacuums of various degrees.

With these objects in view, as well as other objects, which will appear during the course of the specification, reference will now be had to the drawings, wherein:

Fig. 1 is an elevational view partly in section of a filling apparatus for engine fuel tanks embodying this invention.

Fig. 2 is an enlarged fragmentary sectional view of the valve structure.

Fig. 3 is a plan view of the upper portion of the valve structure.

Fig. 4 is a horizontal cross section taken on line IV—IV of Fig. 2.

Fig. 5 is a cross sectional view taken on line V—V of Fig. 2.

Throughout the several views like reference characters refer to similar parts and the numeral 10 designates a liquid fuel tank positioned above the motor 12 of a typical farm tractor or any other type of automotive vehicle provided with an internal combustion engine as motive power. Tank 10 is provided with an adapter 14 notched at 16 through which is formed an opening to the tank 10. The body 18 of the apparatus is provided with a central bore 20 provided at its upper extremity with a frusto-conical section 22. Bore 20 extends entirely through the body 18 and is provided at its upper extremity with a cover or closure 24 pivoted at 26 by means of which the bore is normally closed. An annular flange 28 disposed intermediate the ends of body 18 extends outwardly to form a ledge 30 against which is seated a sealing unit comprising gaskets 32 spaced apart by a metal washer 34. That portion of the body 18 directly beneath flange 28 is externally threaded at 36 to receive a nut 38 having lugs 40 extending radially from the periphery thereof and positioned adjacent the lower edge thereof whereby said lugs may be inserted through notches 16 formed in adapter 14 and turned to engage said adapter whereby the parts are secured together. When so positioned with the lugs 40 disposed against the depending lugs 42 of the adapter, the body 18 may be screwed downwardly through nut 38 so that the gaskets will set tightly against the upper surface of the adapter 14 to seal the joint between the body and the fuel tank. For the purpose of reenforcing the body 18 above the flange 28, longitudinal ribs 44 are provided to extend outwardly beyond said body. These ribs also serve to permit wrench gripping means whereby the body may be turned in the nut 38. Cover 24 is provided with a radially disposed lug 46 constructed to form a notch 48 and an inclined surface 50 whereby the spring wire bail 52 extending through rib 44 at 54, may be swung through an arc to engage and urge the cover to the closed position as shown in solid lines in Figs. 2 and 3.

The fuel container 56 shown in Fig. 1, is provided with a top opening 58 through which the flexible tube 60 is inserted with its lower extremity provided with a screen cap 62 for straining the fuel passing into tube 60. This tube is of sufficient length to extend to and be inserted in the frusto-conical section 22 of the body 18 when the cover is moved to the open position. This tube 60 is so constructed that when inserted into the tapered portion of bore 20, it will fit snugly therein to prevent leakage of air therebetween.

The lower extremity of the body or valve member 18 extends into the tank to a point slightly below the predetermined liquid level of the filled tank so that liquid fuel introduced into the bore 20 will pass directly therethrough and will be delivered to the tank at a point below the top thereof. An internal rib 64 extending from the bottom of the body member 18 extends upwardly to a point adjacent and above the flange 28. The rib 64 is bored out to form a cylindrical recess 66 which extends upwardly adjacent flange 28 where it is offset at 68 and bored concentrically at 71 at a smaller diameter to form a valve seat 70.

The lower extremity of recess 66 is tightly closed by a plug 72. A cylindrical valve 74 relatively smaller in diameter than the recess 66 is mounted in said recess to normally rest on plug 72. This valve is adapted under certain conditions to be raised by the action of fluid passing from the fuel tank upwardly through recess 66. A passageway 76 formed in body member 18 is disposed at substantially right angles to recess 71 communicates therewith and is provided with a nipple 78 and a coupling 80 by means of which the suction tube 82 is connected with the intake manifold 84 of the motor 12. This tube 82 is provided with the usual control valve 88.

The outer wall 90 of body member 18 is provided with an inlet opening 92 which communicates with the fuel tank adjacent its top. This opening 92 is so positioned that it communicates with the cylindrical recess 66 adjacent the longitudinal center of valve 74 when said valve is resting on plug 72. A fixed atmospheric inlet passageway 94 communicating with bore 20 above tank 10 is of proper size to admit a sufficient amount of air into the fuel tank at all times to prevent an excessive vacuum in said tank. It will be observed that the upper end of valve 74 is conical shaped at 96 so as to fit the valve seat 70.

While in the drawings, the parts just described, have been shown substantially of a correct relative scale, however, the actual dimensions as used on the device are substantially as follows:

The diameter of cylindrical recess 66 is $^{11}/_{32}''$. The diameter of valve 74 is $^{1}/_{4}''$; the opening 92 is $^{3}/_{16}''$ in diameter and the passageway 94 is $^{81}/_{1000}''$. It should be kept in mind that while these dimensions are correct for a certain size valve mechanism and for a certain range of vacuums, yet slight modifications might be found advisable when this factor is varied. In a structure as described and with the dimensions set forth, it was found that the valve worked satisfactorily throughout the normal range of vacuum (from 12 to 22 inches of vacuum) throughout the various tests made.

In the operation of this filling apparatus, the operator connects the supply tube 60 with the valve body, as shown in the dotted lines in Fig. 2, then opens the vacuum line valve 88 and starts the engine 12, thus drawing air through opening 92 about valve 74, thence upwardly through recesses 66 and 71, passageway 76, then into tube 82. When sufficient vacuum has been produced in the fuel tank 10, the fuel will pass through strainer 62, thence upwardly to tube 60 and into the body member 18 where it will be discharged through bore 20 into the fuel tank 10. As the fuel is being discharged into the tank, atmospheric air will enter bore 20 through passageway 94 due to the differential of atmospheric pressure and the pressure in tank 10. As the liquid level in tank 10 raises to a point adjacent the bottom end of opening 92, valve 74 will be forced upwardly to engage seat 70 so as to close the connection to the low pressure compartment of the engine, thereby breaking the vacuum in the fuel tank which will be immediately equalized through passageway 94. The tube 60 can now be removed and cover 24 closed; the control valve 88 is then closed so that valve 74 again drops by gravity to position on plug 72.

During the filling operation, the amount of air passing through inlet 94 is dependent in some degree to the differential of pressure inside and outside said fuel tank so that with the ports formed and positioned as described, the increase of flow of air through passageway 94 as the vacuum in tank 10 is increased, will function to prevent a too high pressure in said tank that might cause it to collapse.

Having thus described my invention, what I claim as new and desire to be secured by Letters Patent is:

1. In a fuel tank filling device, a tubular body member having a constantly open atmospheric passageway through a wall thereof and releasably connected to communicate with the top of a fuel tank and with a fuel container positioned therebelow whereby fuel forced from said container will pass into said fuel tank, a valve chamber formed in said body member having a valve seat adjacent its upper end and a side inlet port adjacent its lower end communicating with said fuel tank, a tube interconnecting said valve chamber with an area of sub-atmospheric pressure, and an elongated non-buoyant valve mounted to normally rest on the bottom of said valve chamber below said valve seat with its central portion adjacent said inlet port and spaced apart therefrom to form a restricted flow channel around said valve, said channel extending substantially above said inlet port, whereby when the fuel in said fuel tank enters said inlet port, said valve will be forced upwardly by the upward flow of fuel through said valve chamber to close the connection from said fuel tank to said area of low pressure.

2. In a fuel tank filling device, a tubular body member having a constantly open passageway to the atmosphere formed through the wall thereof and releasably connected to communicate with the top of a fuel tank and with a fuel container positioned therebelow whereby fuel forced from said container will pass into said fuel tank, a valve chamber formed in said body member having a valve seat adjacent its upper end and a side inlet port adjacent its lower end communicating with said fuel tank, a tube interconnecting said valve chamber above said seat with an area of sub-atmospheric pressure, an elongated non-buoyant valve mounted to normally rest on the bottom of said valve chamber below said valve seat with its central portion adjacent said inlet port and spaced apart therefrom to form a restricted flow channel around said valve, said channel extending substantially above said side inlet port, whereby when the fuel in said fuel tank enters said inlet port, said valve will be moved to close the connection from said fuel tank to said area of low pressure, and manually operable means whereby the connection from said fuel tank to said area of sub-atmospheric pressure is controlled.

3. In a fuel tank filling device, a tubular body member having a constantly open atmospheric passageway through a wall thereof and releasably connected to communicate with the top of a fuel tank and with a fuel container positioned therebelow whereby fuel forced from said container will pass into said fuel tank, a cylindrical valve chamber having a closed bottom portion formed in said body member having a valve seat adjacent its upper end and a side inlet port adjacent its lower end communicating with said fuel tank above said bottom portion, a tube interconnecting said valve chamber with an area of sub-atmospheric pressure, and an elongated cylindrical non-buoyant valve of slightly less diameter than the diameter of said valve chamber mounted to normally rest on the bottom of said valve chamber below said valve seat with its central portion adjacent said inlet port and spaced therefrom to form a restricted flow channel about said valve extending substantially above said inlet port, whereby when the fuel in said fuel tank enters said inlet port, said valve will be moved thereby to close the connection from said fuel tank to said area of low pressure, and manually operable means whereby the connection from said fuel tank to said area of sub-atmospheric pressure is controlled.

4. In a fuel tank filling device, a tubular body member having a constantly open, restricted atmospheric passageway through a wall thereof and provided at its upper end with a frusto-conical section adapted to hermetically receive one end of a pliable tube adapted to interconnect with the top of a fuel tank and with a fuel container positioned therebelow whereby fuel forced from said container will pass into said fuel tank, a valve chamber formed in said body member having a valve seat adjacent its upper end and a side inlet port adjacent its lower end communicating with said fuel tank, a tube interconnecting said valve chamber with an area of sub-atmospheric pressure, and an elongated non-buoyant valve mounted to normally rest on the bottom of said valve chamber below said valve seat with its central portion adjacent said inlet port and spaced apart therefrom to form a restricted flow channel about said valve extending substantially above said port, whereby said valve will remain at the bottom of said valve chamber during the filling operation until the liquid in said fuel tank enters said inlet port, when it will be moved by the passage of said liquid fuel to engage said valve seat.

5. In a fuel tank filling device, a tubular body member having a constantly open atmospheric passageway through a wall thereof and releasably connected to communicate with the top of a fuel tank and with a fuel container positioned therebelow whereby fuel forced from said container will pass into said fuel tank, a valve chamber formed in said body member having a valve seat adjacent its upper end and a side inlet port adjacent its lower end relatively larger than said atmospheric passageway communicating with said fuel tank, a tube interconnecting said valve chamber with an area of sub-atmospheric pressure, and an elongated non-buoyant valve mounted to normally rest on the bottom of said valve chamber below said valve seat with its central portion adjacent said inlet port and spaced apart therefrom to form a restricted flow channel about said valve extending substantially above said inlet port, whereby when the fuel in said fuel tank enters said inlet port said valve will be moved to close the connection from said fuel tank to said area of low pressure and the vacuum in said fuel tank will be quickly relieved through said atmospheric passageway.

FRED T. RANNEY.

REFERENCES CITED

The following references are of record in the file of this patent:

UNITED STATES PATENTS

| Number | Name | Date |
|---|---|---|
| 1,443,977 | Carr | Feb. 6, 1923 |
| 1,913,078 | Hays | June 6, 1933 |
| 2,225,844 | Pye | Dec. 24, 1940 |
| 2,317,589 | Collinson | Apr. 27, 1943 |
| 2,356,428 | Ranney | Aug. 22, 1944 |